(12) United States Patent
Cañas

(10) Patent No.: US 11,304,051 B2
(45) Date of Patent: Apr. 12, 2022

(54) ROAMING MANAGEMENT SYSTEM

(71) Applicant: Metaswitch Networks Ltd., Enfield (GB)

(72) Inventor: Jorge Cañas, Richardson, TX (US)

(73) Assignee: METASWITCH NETWORKS LTD., Enfield (GB)

( * ) Notice: Subject to any disclaimer, the term of this patent is extended or adjusted under 35 U.S.C. 154(b) by 0 days.

(21) Appl. No.: 16/905,526

(22) Filed: Jun. 18, 2020

(65) Prior Publication Data

US 2021/0400464 A1 Dec. 23, 2021

(51) Int. Cl.
*H04W 8/04* (2009.01)
*H04W 8/18* (2009.01)
*H04W 76/10* (2018.01)
*H04L 65/1016* (2022.01)
*H04L 65/10* (2022.01)

(52) U.S. Cl.
CPC ............ *H04W 8/18* (2013.01); *H04W 8/04* (2013.01); *H04W 76/10* (2018.02); *H04L 65/1006* (2013.01); *H04L 65/1016* (2013.01)

(58) Field of Classification Search
CPC ........ H04W 8/18; H04W 76/12; H04W 76/10
See application file for complete search history.

(56) References Cited

U.S. PATENT DOCUMENTS

| 9,794,769 | B2 | 10/2017 | Dubesset et al. |
| 2010/0290403 | A1 | 11/2010 | Lindholm et al. |
| 2013/0171974 | A1 | 7/2013 | Bae |
| 2018/0352528 | A1 | 12/2018 | Kunz et al. |
| 2020/0229118 | A1* | 7/2020 | Martinez-Minguito ..................... H04W 60/00 |
| 2021/0176634 | A1* | 6/2021 | Badar ................. H04L 65/1016 |

OTHER PUBLICATIONS

"Roaming Handling for VoLTE APN", In 3GPP Draft; S2-120589 Volte IMS APN Roaming, 3rd Generation Partnership Project (3GPP), Mobile Competence Centre, Feb. 6, 2012, 2 Pages.
"International Search Report and Written Opinion Issued in PCT Application No. PCT/US21/037958", dated Nov. 23, 2021, 20 Pages.

* cited by examiner

*Primary Examiner* — Michael T Vu
(74) *Attorney, Agent, or Firm* — Newport IP, LLC; Han K. Gim

(57) ABSTRACT

The disclosures relates to a method of provisioning a subscriber profile into a subscriber data store of an IP Multimedia System (IMS) capable telecommunications network, the subscriber profile being for a subscriber which is a visiting subscriber with respect to the IMS-capable telecommunications network, the subscriber data store being for use in IP Multimedia System (IMS) call processing, the method comprising: receiving a request to allocate an IMS Access Point Name (APN); and in response to receiving the request to allocate the IMS APN, triggering a provisioning of the subscriber profile into the subscriber data store.

17 Claims, 5 Drawing Sheets

ROAMING MANAGEMENT SYSTEM

BACKGROUND

Technical Field

Embodiments of the present disclosure relate to provisioning a subscriber profile into a subscriber data store of an IP Multimedia System (IMS) capable telecommunications network.

Background

The vast majority of mobile operators in the world today support 2G and 3G, i.e. circuit-switched, voice services. However, only a small subset of them have deployed Voice over LTE (VoLTE), which requires an IP Multimedia Subsystem (IMS) core whereby non-circuit-switched, packet-based voice calls can be conducted. Even less have currently deployed Voice over 5G (known as Voice over New Radio (VoNR)). Those operators who have deployed VoLTE and/or VoNR may consider shutting down their 2G/3G networks because 1) they may wish to re-purpose the 2G/3G spectrum for 4G and/or 5G Radio Access Networks (RANs), 2) they may not want the expense of having to operate and maintain a legacy network (RAN and core) in addition to their IMS core. However, if these operators shut down their 2G/3G networks, it will result in their networks no longer being able to accept 2G/3G inbound roamers, i.e. subscribers of 2G/3G-only home networks (those without IMS), who can only continue to attach to 2G/3G networks while roaming.

An alternative, which allows operators to repurpose the 2G/3G spectrum for 4G/5G, and to shut down the 2G/3G network core, and to retain the ability to accept 2G/3G inbound roamers, is preferred. Especially if that alternative only involves a comparably small alterations to their network equipment.

At a high level, the technical difference in roaming between 2G/3G and VoLTE and/or VoNR is that in 2G/3G networks the voice service is provided by the visited network's MSC/VLR (Mobile Switching Centre and Visited Location Register) when subscribers roam; in contrast, in VoLTE and VoNR, the home IMS core provides the voice service even while/when roaming Consequently, the HLR in the home network keeps track of the visited MSC/VLR so that inbound calls can be routed to the subscriber. This does not need to happen in VoLTE and VoNR because the subscriber is always serviced by the home IMS core network infrastructure.

It would be desirable to allow non-circuit-switched operators to service inbound roamers from non-IMS capable home networks, while enabling them to shutdown 2G/3G coverage, with only relatively small changes in their network equipment.

SUMMARY

According to a first aspect of the present disclosure, there is provided a method of provisioning a subscriber profile into a subscriber data store of an IP Multimedia System (IMS) capable telecommunications network, the subscriber profile being for a subscriber which is a visiting subscriber with respect to the IMS-capable telecommunications network, the subscriber data store being for use in IP Multimedia System (IMS) call processing, the method comprising:

receiving a request to allocate an IMS Access Point Name (APN); and in response to receiving the request to allocate the IMS APN, triggering a provisioning of the subscriber profile into the subscriber data store.

The method may be performed in a modified Serving Gateway/Packet Data Network Gateway (SGW/PGW) for 4G and/or a Session Management Function/User Plane Function SMF/UPF for 5G, which may be specially adapted for use with roaming subscribers from networks which don't have VoLTE and/or VoNR.

According to a further aspect of the present disclosure there is provided a method of provisioning a subscriber in an IP Multimedia System (IMS) capable telecommunications network, the subscriber being a visiting subscriber with respect to the IMS-capable telecommunications network, the method comprising:

initially provisioning a subscriber profile for the subscriber; and installing a set of supplementary services for the subscriber subsequently, during a registration procedure which involves use of the subscriber profile.

By means of an initial provisioning process, which may be conducted during an attach procedure, or alternatively during an early part of the registration procedure, a subscriber profile may be set up in an IMS Home Subscriber Server (HSS) in time for at least of a part of the provisioned subscriber profile to be used during the registration procedure, in which the subscriber is then recognised as belonging to the network. This has the advantage of getting the provisioning process completed before the registration arrives at the IMS core.

In aspects of the invention, an IMS deployment is modified, so that it can present itself to a roaming subscriber's home GSM network, as a visited GSM MSC/VLR.

The invention enables a VoLTE and/or a VoNR visited network to pretend to be a 2G/3G roaming network towards the home network so that the home network does not need to deploy IMS, but more importantly, it enables the visited network to accept inbound roamers without having a 2G/3G network of its own thereby allowing it to reduce operational costs and retain inbound roaming revenue.

Further features and advantages described herein will become apparent from the following description of preferred embodiments, given by way of example only, which is made with reference to the accompanying drawings.

BRIEF DESCRIPTION OF THE DRAWINGS

In the Figures and accompanying description, parts and steps common between different examples are identified by the same reference numerals.

DETAILED DESCRIPTION

Figure 1:
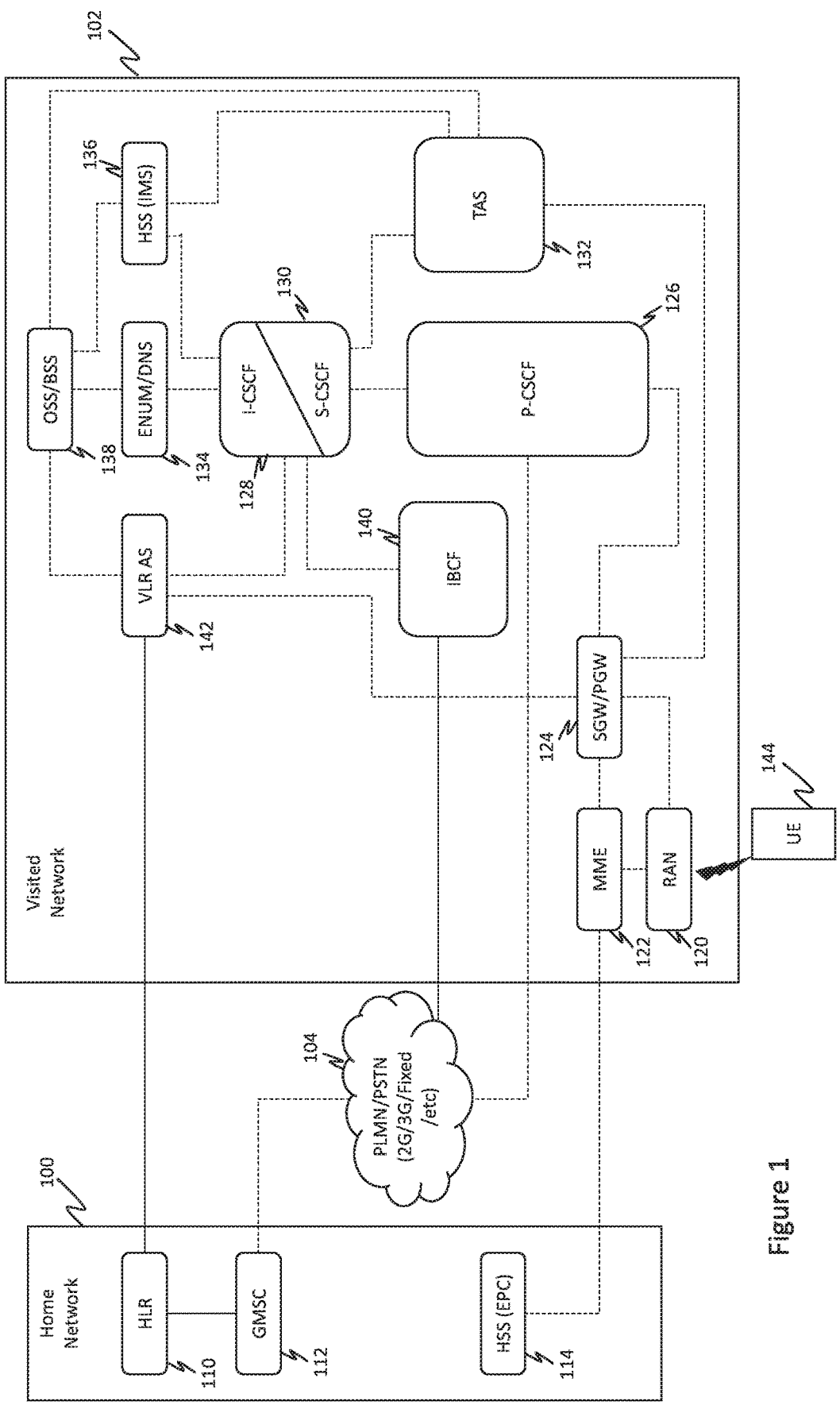
FIG. 1 is a schematic block diagram depicting an exemplary telecommunications network arrangement including a home network and a visited network.

FIG. 1 is a schematic block diagram depicting a telecommunications network arrangement in accordance with an example, including a home network 100 and a visited network 102, connected via an interconnect network 104 such as a Public Switched Telephony Network (PSTN) or a Public Land Mobile Network (PLMN), or other private data communications links.

The home network 100 is, in this example, not VoLTE-capable and does not contain an IMS core for telephony, rather relying on circuit-switched 2G and/or 3G infrastructure. However, the home network does have an Evolved Packet Core (EPC), the key part of the 4G (LTE) system for data packet-based telecommunications (without IMS telephony.)

The home network includes a subscriber data store in the form of a GSM Home Location Register (HLR) 110, a Gateway MSC (GMSC) 112, a subscriber data store in the form of an EPC Home Subscriber Server (HSS (EPC)) 114, and other conventional 2G (GSM), 3G (UMTS) and 4G (LTE) functions and nodes (not shown).

The visited network 102 is, in this example, VoLTE-capable—as described in the GSM Association Official Document FCM.01–"VoLTE Description and Implementation Guidelines" Version 1.1, the contents of which are incorporated herein by reference. The visited network includes an IMS core for telephony. The visited network may not include any circuit-switched 2G and/or 3G infrastructure.

The visited network includes a Radio Access Network (RAN) 120, at least one Mobility Management Entity (MME) 122, at least one modified Serving Gateway/Packet Data Network Gateway (SGW/PGW) 124, at least one Proxy Call Session Control Function (P-CSCF) 126, at least one Interrogating Call Session Control Function (I-CSCF) 128, at least one Serving Call Session Control Function (S-CSCF) 130, at least one Multimedia Telephony (MMTel) capable VoLTE Telephony Application Server (TAS) 132, an E.164 Number Mapping and Domain Name System (ENUM/DNS) server 134, a subscriber data store in the form of an HSS (IMS) 136, an Operations Support Systems and Business Support Systems (OSS/BSS) 138, an Interconnection Border Control Function (IBCF) 140 and other conventional 4G (LTE) and IMS functions and nodes (not shown).

The visited network may also include 5G network infrastructure (not shown). In addition, the visited network in this example includes a new node, referred to herein as a Visitor Location Register Application Server (VLR AS) 142. The modified Serving Gateway and Packet Data Network Gateway (SGW/PGW) 124 includes functionality to notify the VLR AS 142 of a new roaming subscriber's VoLTE-capable UE 144 attaching to the visited network. The visited network may also include at least one unmodified Serving Gateway and Packet Data Network Gateway (SGW/PGW) (not shown) which does not include that functionality.

The VLR AS 142 acts as a conventional GSM VLR in the visited network 102 in relation to the HLR 110 of the home network 100. The VLR AS 120 is also an IMS application server (AS) and is configured to provide additional functionality within the visited network 102 as described in more detail in relation to the examples described below.

A roaming subscriber must be accepted to register into an IMS core. However, IMS only allows subscribers from its own network to attach to it. This means that in order to allow an "inbound roamer" to attach to an IMS core, that IMS core needs to be able to recognize it as a subscriber. In this example, this problem is solved by a roaming subscriber profile being initially provisioned into the HSS (IMS) 136 during an attach procedure of the UE 144. The modified SGW/PGW 124 receives a request to allocate an IMS Access Point Name (APN), and in response to receiving the request to allocate the IMS APN, triggers a provisioning of the subscriber profile into the HSS (IMS) 136. The modified SGW/PGW 124, in response to receiving the request to allocate an IMS APN from the MME 122, allocates the IMS APN and sends a confirmation message indicative of the allocated IMS APN to the MME 122.

The modified SGW/PGW 124 is in this example only assigned to roaming subscribers from networks which don't have VoLTE (this can be done using standard procedures), so that when the node receives a request to create the IMS APN, the node triggers an initial provisioning of the subscriber into the visited network's IMS HSS. This initial provisioning may be later supplemented by more provisioning into the VoLTE TAS 132 when the VLR AS 142 fetches the subscriber's supplementary service data from the HLR 110.

The modified SGW/PGW 124 may trigger the provisioning in response to receiving the request to allocate the IMS APN, by transmitting a notification to the VLR AS 142. The VLR AS 142 may, in response receiving the notification, transmit a request to provision the subscriber profile into the HSS (IMS) 136. The HSS (IMS) 136 may be configured to store subscriber profiles for subscribers which are home subscribers with respect to the IMS-capable telecommunications network, so that the functionality of this example may be incorporated into the visited network without needing to replace the conventional HSS (IMS) 136 of the visited network.

After the attach procedure completes, the UE 144 may perform an IMS registration procedure for receiving IMS services. In this example the VLR AS 142 receives a SIP REGISTER message originated by the UE 144, and in response to receiving the SIP REGISTER message, triggers a location update in the HLR 110 in the home network 100 of the visiting subscriber.

In response to the location update, in this example the VLR AS 142 receives subscriber data from the HLR 110, derives supplementary services data for the subscriber from the received subscriber data, and transmits the supplementary services data to the VoLTE TAS 132 for use during call processing.

Thus, in this example there is provided a method of provisioning a subscriber in the visited network 102, the subscriber being a visiting subscriber with respect to the visited network 102, the method comprising initially provisioning a subscriber profile for the subscriber, and provisioning a set of supplementary services for the subscriber subsequently, during a registration procedure. By initially provisioning the subscriber profile into the HSS (IMS) 136, the HSS (IMS) 136 may be queried for at least of a part of the provisioned subscriber profile during the registration procedure.

The subscriber's home network 100 may be unaware that the subscriber is attaching to IMS, and instead may proceed as if the subscriber is attaching to a 2G/3G MSC/VLR. This is achieved in an example by having the VLR AS 142 pretend to be an MSC/VLR. In this example, a subscriber profile provisioning is triggered during the attach procedure. During provisioning into the HSS (IMS) 136, the VLR AS 142 is specified as an application in the initial filter criteria of the subscriber in the subscriber profile which is provisioned. During registration of the UE, the VLR AS 142 is informed that the subscriber has registered. This function recognizes that the subscriber is a roamer and pretend to be a VLR by contacting the HLR 110 at the home network using the same procedures that a real VLR would have performed when a subscriber attaches to a corresponding 2G/3G network.

The subscriber's originating supplementary service set is preferably installed in the visited network when the visiting subscriber roams to it. This is in this example achieved by the VLR AS 142 downloading the originating services set from the HLR 110 (just as a normal VLR would do) after the attach is accepted, preferably during registration of the UE 144. The VLR AS 142 may then provision the applicable equivalent IR.92 set into the VoLTE TAS 132. The VLR AS 142 may also download the Originating Camel Subscription Information (O-CSI) and provision it into the IM-Service Switching Function (IM-SSF) (not shown in FIG. 1).

Figure 2:
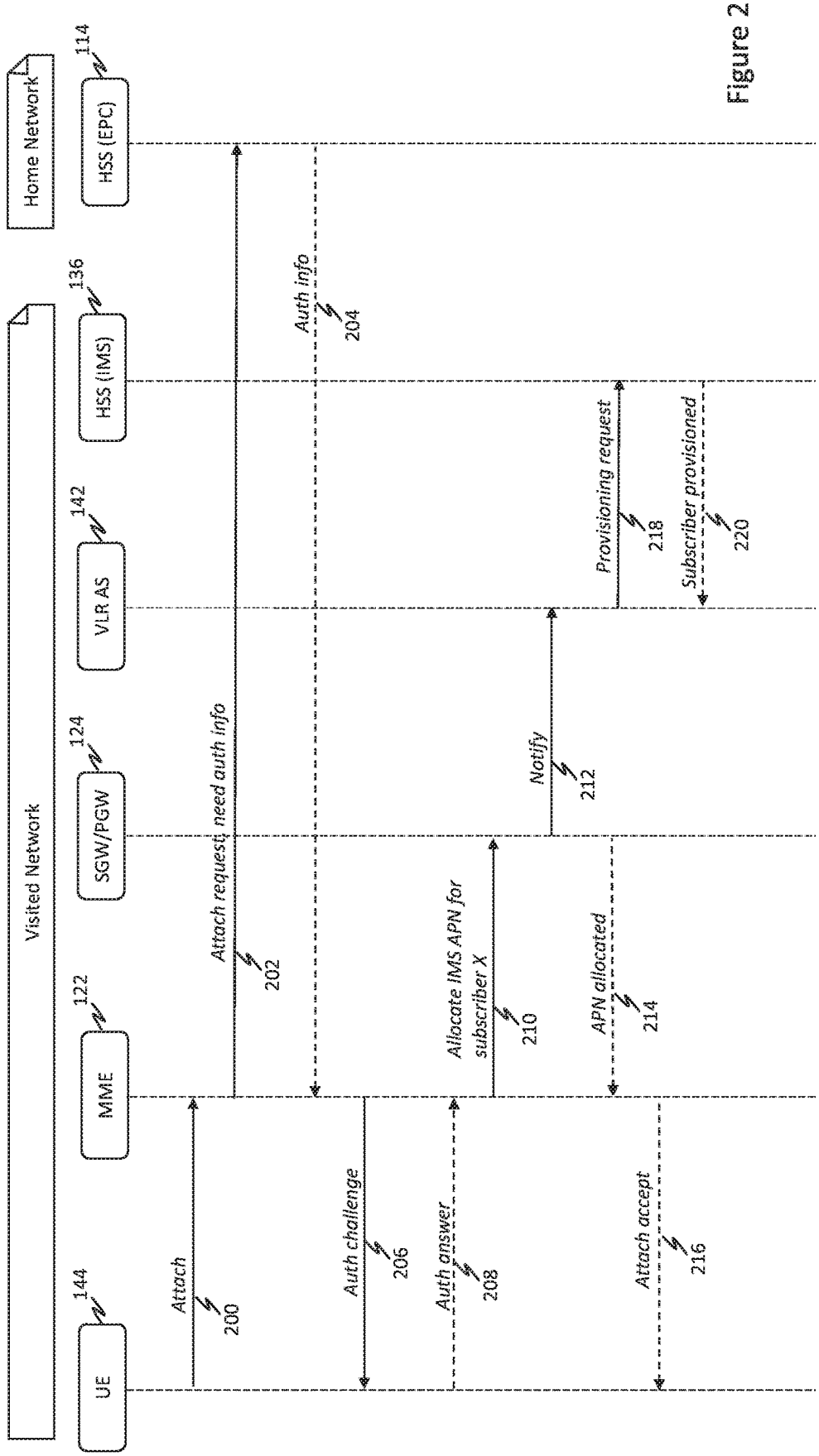
FIG. 2 is a sequence diagram showing an exemplary attach procedure.

Referring now to FIG. 2, which is a sequence diagram showing an exemplary attach procedure, the attach procedure is initiated by the UE 144, using an attach request message 200 which includes a request for VoLTE services. The UE 144 sends the attach request message 200 to the MME 122, which recognises the UE as a roaming subscriber attached to the home network 100 and sends an authentication information request message 202 to the HSS (EPC) 114 of the subscriber's home network 100. In response, the HSS (EPC) 114 transmits an authentication information response message 204 back to the MME 122. From that message, the MME 122 is able to generate an authentication challenge message 206, which it sends to the UE 144. The UE 144 performs a cryptographic function on the challenge and generates an authentication response, which it transmits back to the MME 122 in an authentication answer message 208. On successful authentication, the MME 122 looks up the appropriate SGW/PGW 124 to handle the roaming subscriber and requests the allocation of an IMS APN for the roaming subscriber from the SGW/PGW 124 in a request message 210. Since the SGW/PGW is modified, it notifies the VLR AS 142 of the attachment of the roaming subscriber, message 212, whilst also allocating the IMS APN and notifying the MME 122 of the allocated APN, message 214. When the MME 122 receives the IMS APN allocation, it transmits the results to the UAE in an attach accept message 216.

On receiving the notification message 212, the VLR AS 142 initially provisions the subscriber profile into the HSS (IMS) 136 using provisioning request message 218 and receives confirmation from the HSS (IMS) 136 that the subscriber has been provisioned, in message 220.

Figure 3A:
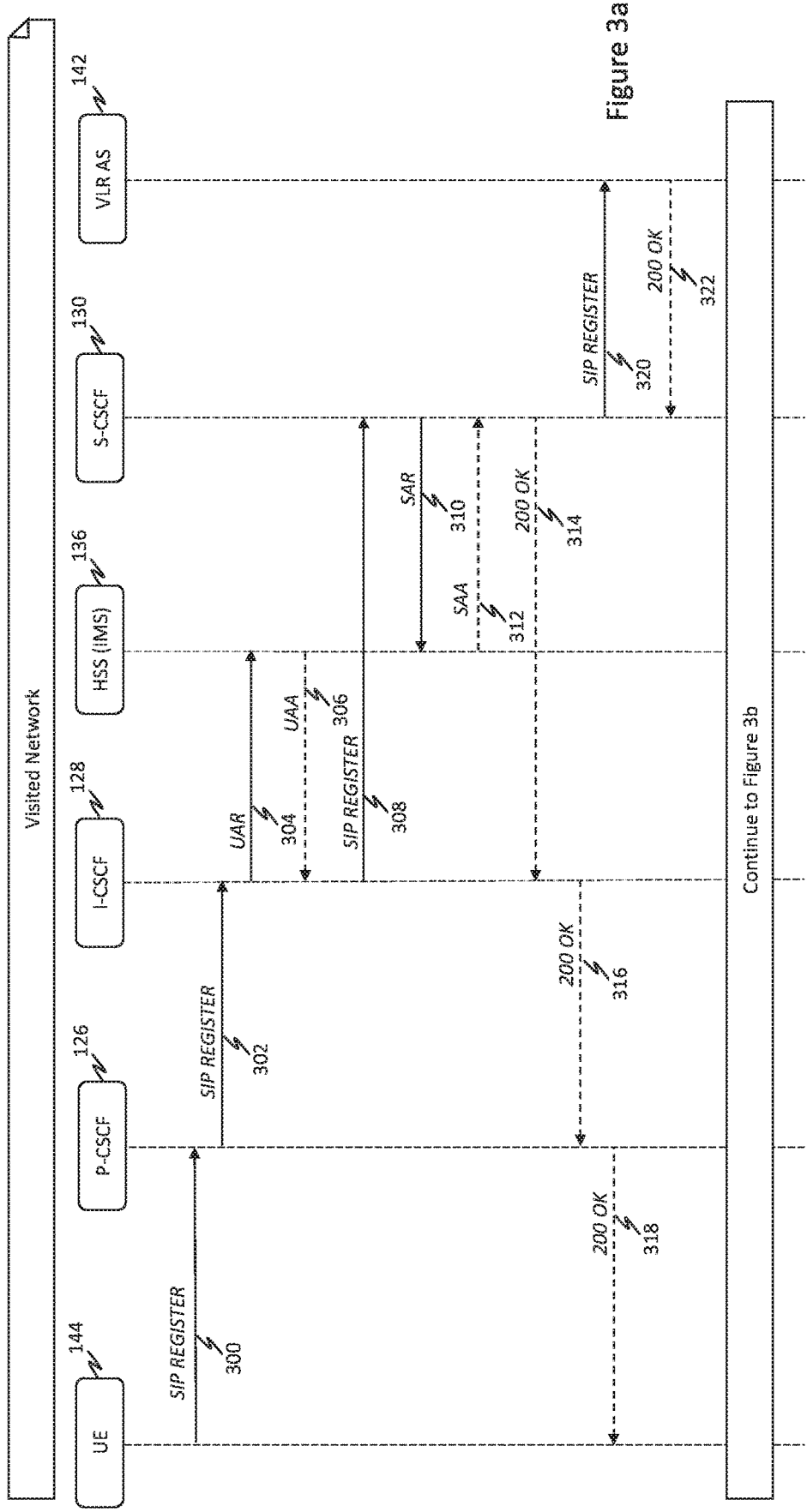
FIGS. 3a and 3b are sequence diagrams showing an exemplary registration procedure.

Referring now to FIG. 3a, which is a sequence diagram showing the start of an exemplary IMS registration procedure, the registration procedure is initiated by the UE 144, using a Session Initiation Protocol (SIP) REGISTER message 300 which includes a request for IMS service. The UE 144 attempts to register by sending a SIP REGISTER message to the P-CSCF 126. The P-CSCF forwards the SIP REGISTER message 302 to the I-CSCF 128, which transmits a user authentication request (UAR) Diameter message 304 to the HSS (IMS) 136. The HSS (IMS) 136 responds with a user authentication answer (UAA) Diameter message 306. When initially provisioning the subscriber profile in the HSS 136, a setting is enabled which means that the subscriber does not need to be authenticated once more in the IMS system, after having been authenticated during the attach procedure. Alternatively, the subscriber profile in the HSS 136 could refer to authentication information in an Authentication Centre (AuC) that is collocated with an HLR. The I-CSCF 128 then forwards the SIP REGISTER message 308 to the S-CSCF 130, which proceeds to transmit a server assignment request (SAR) Diameter message 310 to the HSS 136, in response to which the HSS 136 sends a server assignment answer (SAA) Diameter message to the S-CSCF 130, including initial filter criteria which indicate that the S-CSCF 130 should trigger forwarding of the SIP REGISTER message to the VLR AS 142. In the meantime, the S-CSCF responds to the original SIP REGISTER message with a 200 OK response message 314, which is passed to the I-CSCF 128, which forwards the message 316 to the P-CSCF, which in turn forwards the message 318 to the UE 144.

As mentioned above, the S-CSCF 130 triggers forwarding of the SIP REGISTER message due to initial filter criteria which have been set in the subscriber profile in the HSS 136. This results in a SIP REGISTER message 320 being sent to the VLR AS 142, which responds with a 200 OK response message 322.

Figure 3B:
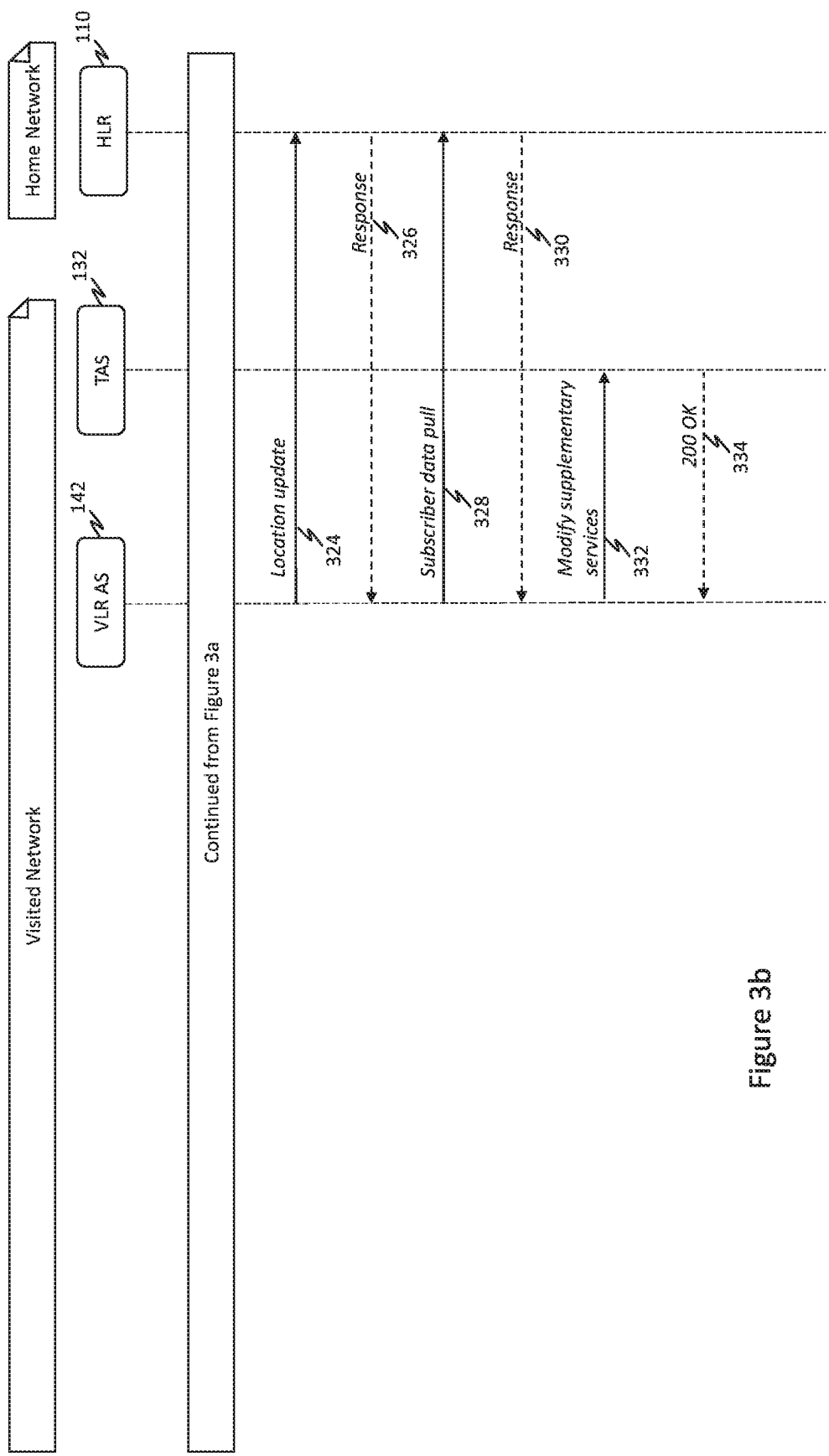

Referring now to FIG. 3b, which is a sequence diagram showing the last part of an exemplary IMS registration procedure, in response to the message 320 from the S-CSCF, the VLR AS triggers a location update, which is performed by the VLR AS sending a location update message 324 to the HLR 110. After receipt of a suitable response message 326, the VLR AS 142 requests subscriber data in a subscriber data Paul message 328 from the HLR 110, which provides subscriber services information in a suitable response message 330. On receipt of the subscriber data, the VLR AS 142 sends a message to the VoLTE TAS 132 to modify the supplementary services set for the roaming subscriber, in a message 332. The TAS 132 sets the supplementary services up for the subscriber and responds with a 200 OK response message 334.

Figure 4:
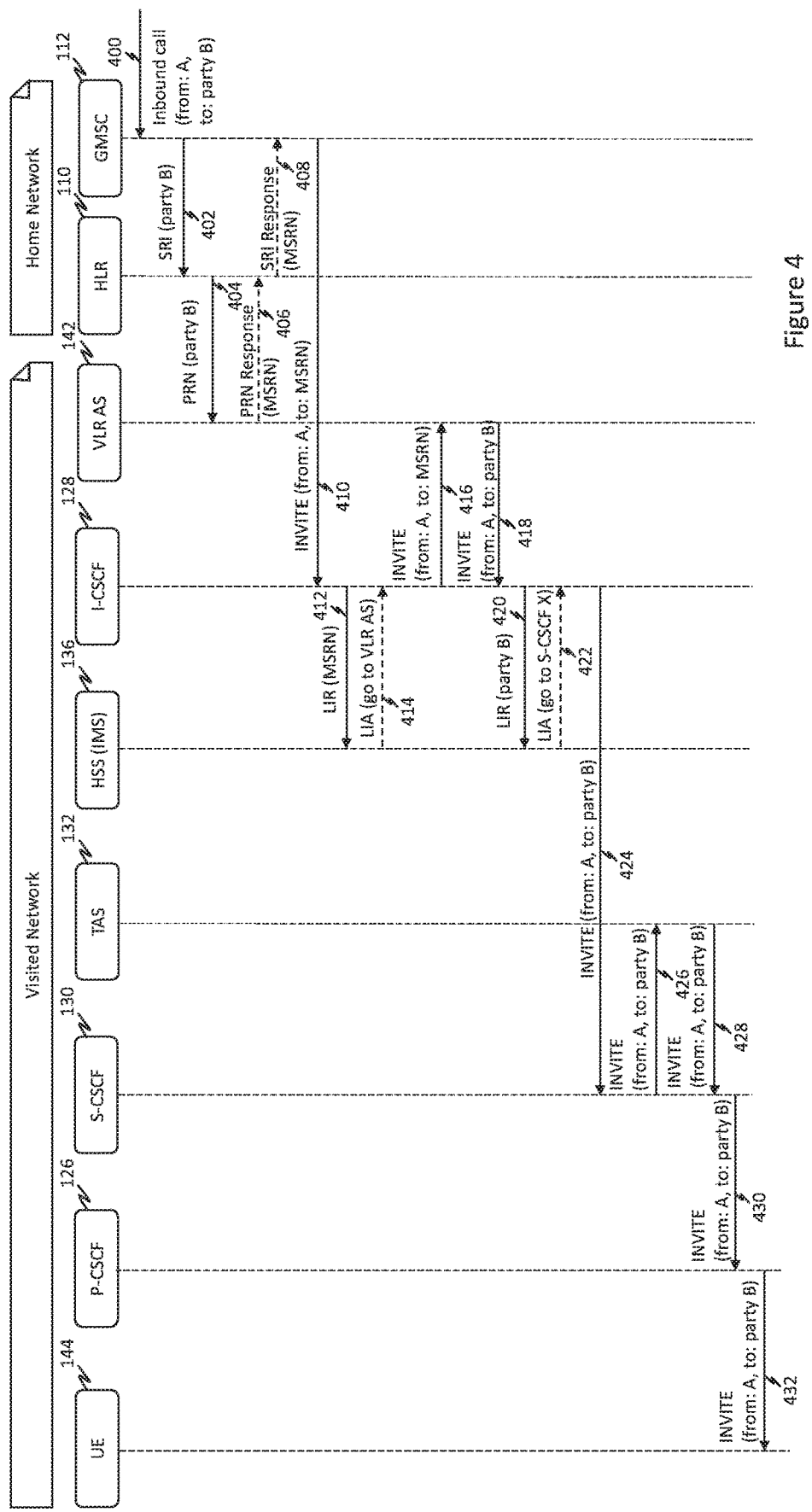
FIG. 4 is a sequence diagram showing an exemplary incoming call flow.

FIG. 4 is a sequence diagram showing an exemplary incoming call flow. A mobile terminating call arrives at the roaming subscriber's home network as they normally do. The GMSC 112 then queries, with MAP SRI message 402, the HLR 110 and the HLR 110 retrieves, with MAP PRN message 404, a Mobile Station Roaming Number (MSRN) from the VLR AS 142. This request lands on the VLR AS 142 as it is pretending to be a VLR and it behaves just like a VLR, by assigning an MSRN to the MSISDN contained in the request. The assigned MSRN is a wildcarded public service identity (PSI). This MSRN is sent back to the HLR 110 in PRN response message 406, which is in turn provided to the GMSC 112 in SRI response message 408. The GMSC 112 is then routed the call towards the network hosting the MSRN, i.e. the visited network, using an INVITE message 410. So, from the point of view of the home network 100, the call flow is like that of a normal incoming call when the subscriber is roaming on a circuit-switched 2G/3G network.

When the call arrives at the visited network 102, the call is routed into the I-CSCF 128, which will query the HSS 136 using a Location-Info Request (LIR) message 412. The HSS 136 finds that the MSRN matches the wildcarded PSI and that the PSI is serviced by the VLR AS 142 and provide that information in a Location-Info Answer (LIA) message 314. So, the call is routed to the VLR AS 142 in INVITE message 416. The VLR AS 142 then matches the MSRN to the assigned MSISDN, replace the MSRN in the INVITE with the MSISDN, and send the INVITE message 418 towards the I-CSCF 128. This looks like a normal terminating IMS call and is handled using subsequent normal IMS messaging, as show in message sequence in FIG. 4 from message 420 to message 432. The downloaded and now provisioned terminating supplementary services for the subscriber are executed by the VoLTE TAS 132 and the call is routed to the subscriber over LTE.

In this example, outgoing call flow is the same as standard VoLTE outgoing call flow.

A further function is built into the VLR AS 142 to perform removal of the roaming subscriber from the visited network's HSS 136 and VoLTE TAS 132. Eventually the subscriber can be removed from the visited IMS databases. This may be done automatically by the VLR AS 142 after a configurable grace period (which starts when the IMS registration expires) has expired. It is also set to be performed by the VLR AS 142 in case the HLR instructs the VLR AS 142 to detach the subscriber and/or because an administrator in the visited network has performed an administrative function that requires removal of the subscriber.

In the above examples, a new function is implemented in a modified node, being a SGW/PGW, which recognizes that the subscriber's home network does not support VoLTE and initiates the provisioning process into its network's IMS core. This has the advantage of getting the initial provisioning completed before the registration arrives at the IMS. Furthermore, the SGW/PGW does not require all SGW/PGWs to be replaced or modified because a specific SGW/PGW for roamers can be selected, using standard 3GPP procedures, by any MME. Furthermore, not all MME's need to be replaced or modified.

Non-Limiting Additional Implementation Details

Although at least some aspects of the embodiments described herein with reference to the drawings comprise computer processes e.g. in the form of agents executed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a hard disk; optical memory devices in general; etc.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), digital signal processor (DSP), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

The above embodiments are to be understood as illustrative examples of the invention. Further embodiments of the invention are envisaged.

For example, an alternative to triggering provisioning using a modified SGW/PGW is to enable an I-CSCF to trigger a "just-in-time" provisioning of the subscriber profile into the HSS (IMS) when a registration event occurs and before the registration is processed in the remainder of the registration process, making use of the newly provisioned subscriber profile.

A further alternative is to a implement a new function in the MME which recognizes that the subscriber's home network does not support VoLTE and so the MME acts as a VLR with respect to the home network during an attach procedure, and may also initiate a provisioning process into its network's IMS core (including the originating supplementary services). This has the advantage of getting the provisioning process completed before the registration arrives at the IMS. However, a disadvantage of this would be that the operator would need to replace all MMEs in its network.

Whilst in the above examples the visited network is a VoLTE capable network, in alternative or in addition it may include VoNR capable networks and future even newer generation networks which are for example IMS-capable. In such examples, the subscriber data store may be a 5G Unified Data Management (UDM) network function rather than an IMS HSS. The elements MME and SGW/PGW from the 4G packet core would then be the Access and Mobility Function (AMF) and Session Management Function/User Plane Function (SMF/UPF) elements, respectively, of the 5G core instead, and the network would include a modified SMF/UPF with provisioning-triggering functionality as described above in relation to the modified SGW/PGW and including a VLR AS, as described above, serving subscribers roaming into the 5G network from a non-VoNR capable network.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of provisioning a subscriber profile into a subscriber data store of an IP Multimedia System (IMS)-capable telecommunications network, the subscriber profile being for a subscriber which is a visiting subscriber with respect to the IMS-capable telecommunications network and from a home network that does not have Voice over LTE (VoLTE), the subscriber data store being for use in IP Multimedia System (IMS) call processing, the method comprising:

receiving, by a modified Serving Gateway and Packet Data Network Gateway (SGW/PGW), a request to allocate an IMS Access Point Name (APN), wherein the modified SGW/PGW is:
operable to simulate a 2G/3G Mobile Switching Center and Visited Location Register (MSC/VLR) to the home network;
assigned to roaming subscribers from networks that do not have VoLTE; and
configured to notify a Visitor Location Register Application Server (VLR AS) that the visiting subscriber's user equipment (UE) has attached to the IMS-capable telecommunications network;

in response to receiving the request to allocate the IMS APN, triggering, by the modified SGW/PGW, a provisioning of the subscriber profile into the subscriber data store by transmitting a notification to the VLR AS;

in response receiving the notification, transmitting by the VLR AS, a request to provision the subscriber profile into a Home Subscriber Server (HSS) of the IMS-capable telecommunications network; and triggering, by the VLR AS, a location update in a home location register (HLR) of the home network of the visiting subscriber.

2. The method of claim 1, wherein the IMS HSS is configured to store subscriber profiles for subscribers which are home subscribers with respect to the IMS-capable telecommunications network.

3. The method of claim 1, further comprising:
receiving a SIP REGISTER message at an IMS Application Server (AS); and
in response to receiving the SIP REGISTER message, triggering a location update in the Home Location Register (HLR).

4. The method of claim 3, comprising:
in response to the location update, receiving subscriber data from the HLR;
deriving supplementary services data for the subscriber from the received subscriber data; and
transmitting the supplementary services data to a Telephony Application Server (TAS) for use during call processing.

5. The method of claim 1, comprising:
installing a set of supplementary services for the subscriber subsequently, during a registration procedure which involves use of the subscriber profile.

6. The method of claim 5, comprising provisioning the subscriber profile into the Home Subscriber Server (HSS); and
querying the HSS for at least of a part of the provisioned subscriber profile during the registration procedure.

7. The method of claim 1, comprising:
receiving the request to allocate an IMS APN from a Mobile Management Entity (MIME); and
allocating the IMS APN; and
sending a confirmation message indicative of the allocated IMS APN to the MME.

8. A method of provisioning a subscriber in an IP Multimedia System (IMS) capable telecommunications network, the subscriber being a visiting subscriber with respect to the IMS-capable telecommunications network, the method comprising:
receiving, by a modified Serving Gateway and Packet Data Network Gateway (SGW/PGW), a request to allocate an IMS Access Point Name (APN), wherein the modified SGW/PGW is:
operable to simulate a 2G/3G Mobile Switching Center and Visited Location Register (MSC/VLR) to the visiting subscriber's home network;
assigned to roaming subscribers from networks that do not have VoLTE, and
configured to notify a Visitor Location Register Application Server (VLR AS) that the visiting subscriber's user equipment (UE) has attached to the IMS-capable telecommunications network;
in response to receiving the request to allocate the IMS APN, triggering, by the modified SGW/PGW, an initial provisioning of a subscriber profile for the subscriber; and
installing a set of supplementary services for the subscriber subsequently, during a registration procedure which involves use of the subscriber profile.

9. The method of claim 8, further comprising provisioning the subscriber profile into a Home Subscriber Server (HSS); and
querying the HSS for at least of a part of the provisioned subscriber profile during the registration procedure.

10. The method of claim 9, wherein the subscriber is from a home network that does not have Voice over LTE (VoLTE).

11. The method of claim 9, further comprising:
in response to receiving the request to allocate the IMS APN, transmitting a notification to an IMS Application Server (AS).

12. The method of claim 11, further comprising, in response receiving the notification, transmitting a request to provision the subscriber profile into the HSS.

13. The method of claim 8, further comprising:
receiving a SIP REGISTER message at an IMS Application Server (AS); and
in response to receiving the SIP REGISTER message, triggering a location update in a Home Location Register (HLR) in a home telecommunications network of the visiting subscriber; and
installing the set of supplementary services for the subscriber in response to the location update.

14. The method of claim 13, further comprising:
in response to the location update, receiving subscriber data from the HLR;
deriving supplementary services data for the subscriber from the received subscriber data; and
transmitting the supplementary services data to a Telephony Application Server (TAS) for use during call processing.

15. A non-transitory computer readable medium containing computer-readable instructions for causing a processor to perform operations for provisioning a subscriber profile into a subscriber data store of an IP Multimedia System (IMS) capable telecommunications network, the subscriber profile being for a subscriber which is a visiting subscriber with respect to the IMS-capable telecommunications network, the subscriber data store being for use in IP Multimedia System (IMS) call processing, the operations comprising:
receiving, by a modified Serving Gateway and Packet Data Network Gateway (SGW/PGW), a request to allocate an IMS Access Point Name (APN)), wherein the modified SGW/PGW is:
operable to simulate a 2G/3G Mobile Switching Center and Visited Location Register (MSC/VLR) to the visiting subscriber's home network; and
configured to notify a Visitor Location Register Application Server (VLR AS) that the visiting subscriber's user equipment (UE) has attached to the IMS-capable telecommunications network; and
in response to receiving the request to allocate the IMS APN, triggering, by the modified SGW/PGW, a provisioning of the subscriber profile into the subscriber data store by transmitting a notification to the VLR AS.

16. The non-transitory computer readable medium of claim 15, wherein the subscriber is from a home network that does not have Voice over LTE (VoLTE).

17. The non-transitory computer readable medium of claim 16, wherein the modified SGW/PGW is assigned to roaming subscribers from networks that do not have VoLTE.

* * * * *